United States Patent [19]

Beugelink

[11] 4,009,913
[45] Mar. 1, 1977

[54] SUCTION NOZZLES FOR DRY-FISH OFF LOADING

[75] Inventor: Frank Beugelink, Durbanville, South Africa

[73] Assignee: Aher Holdings S.A., Luxembourg, Luxembourg

[22] Filed: Apr. 30, 1975

[21] Appl. No.: 573,055

[30] Foreign Application Priority Data

Sept. 26, 1974 South Africa ................... 74/6135

[52] U.S. Cl. ................................... 302/58; 37/61; 214/15 B
[51] Int. Cl.² ...................................... B65G 53/42
[58] Field of Search ............... 302/2 R, 58, 14–16; 37/58, 59, 61, 62, 63; 15/322, 416, 418; 43/6.5; 119/82; 214/15 B

[56] References Cited
UNITED STATES PATENTS

| | | | |
|---|---|---|---|
| 105,056 | 7/1870 | Eads | 37/61 |
| 780,027 | 1/1905 | Edwards et al. | 302/58 X |
| 850,639 | 4/1907 | Gebhardt | 302/58 |
| 1,416,013 | 5/1922 | Gieseler | 302/58 |
| 2,125,740 | 8/1938 | Schacht | 37/62 |

*Primary Examiner*—Evon C. Blunk
*Assistant Examiner*—James L. Rowland

[57] ABSTRACT

A suction nozzle which is particularly suitable for handling fish. The nozzle comprises a tubular casing defining a chamber between opposite ends thereof, one of the ends having a first inlet leading into the chamber and the other of the ends forming an outlet connectable to a hose. The chamber also includes a further inlet through which air may be sucked while fish, etc., are being sucked through the first inlet. The cross-sectional area of the second inlet is adjustable.

1 Claim, 2 Drawing Figures

SUCTION NOZZLES FOR DRY-FISH OFF LOADING

This invention relates to a suction nozzle, and its use. The suction nozzle is especially suitable for the handling of fish.

The present invention provides a suction nozzle comprising a chamber having an outlet and at least two inlets, the cross-sectional area of at least one of said inlets being adjustable.

Conveniently there may be two inlets, one inlet for air only and the other for liquids and/or solids (for example fish and water). The two inlets may have circular walls around them and may be arranged concentrically.

The chamber may comprise a tube which has an inlet at one end and an outlet at the other end. The tube advisably is of larger cross-section at its inlet end than at its outlet end. A collar, which is spaced from the exterior of the tube, may extend from the outside of the tube past the inlet end of the tube and have a lip projecting back into the interior of the tube to form a first inlet between opposite sides of the collar and a second and annular air inlet between the collar and the lip as one wall and the tube as the other wall. A cross-section of the collar walls will show them to be of generally U-shaped longitudinal cross-section, with the limb of the outer wall being longer than the limb of the inner wall which is the lip.

Conveniently, the collar walls and the tube are of circular transverse cross-section. The collar can be slidable with respect to the tube to increase or decrease the cross-sectional area of the second inlet (i.e., the inlet formed between the collar and the tube). By altering the cross-sectional area, the volume of fluid (e.g., air) sucked in can be adjusted to an optimum for the handling procedure desired. The collar may be twisted or extended from, and back towards, the tube to alter its position and hence increase or decrease the cross-sectional area of the second inlet. Means may be provided for locking the collar in an optimum fixed position. For example bolts may be passed through the collar and the tube.

A guard means may be provided around the outside of the collar. The guard means may also act as a means by which the nozzle may be lowered on a hawser into a fluid such as water containing fish. With this in mind, the guard means may comprise a ring spaced ahead of the inlet end of the nozzle and connected thereto by a plurality of stays. In one embodiment, stays are fixedly attached to the collar and the ring, and a further set of stays are fixedly attached to the ring and to a sleeve which is slidable on the tube when the collar is moved with respect to the tube. A lock nut can pass through the sleeve.

The invention also provides a method of handling solids and/or liquids, which comprises submerging the inlet end of a nozzle according to the invention in the liquid and/or pile of solids and sucking up the liquid and/or solids through the chamber while permitting air to be sucked in through the second inlet.

The invention is especially suitable for unloading fish from a ship. The Applicants are aware that fish in the hold of a ship could be present with sea water. In the past the Applicants have found it necessary to pump seawater into the hole and then to pump the fish and seawater out using the seawater as the medium for movement of the fish. They have also found that this causes pollution because of a large volume of seawater has to be used as the medium and this is discharged into the harbour and sea. There often are regulations relating to the prevention of such pollution.

With the present invention fish can be sucked out of the hold, together with a relatively small amount of seawater which might be present, using a large amount of air as the fluid passing in the second inlet of the nozzle. The fish and any water are sucked up through the first inlet of the nozzle. The amount of air entering the chamber can be adjusted to give an optimum for useful working by altering the cross-sectional area of the inlet through which the air enters. This may be done before or during the unloading of the fish, depending on the type of fish. The collar may then be locked in that position.

The invention is illustrated by reference to the accompanying drawings, in which.

Figure 1:
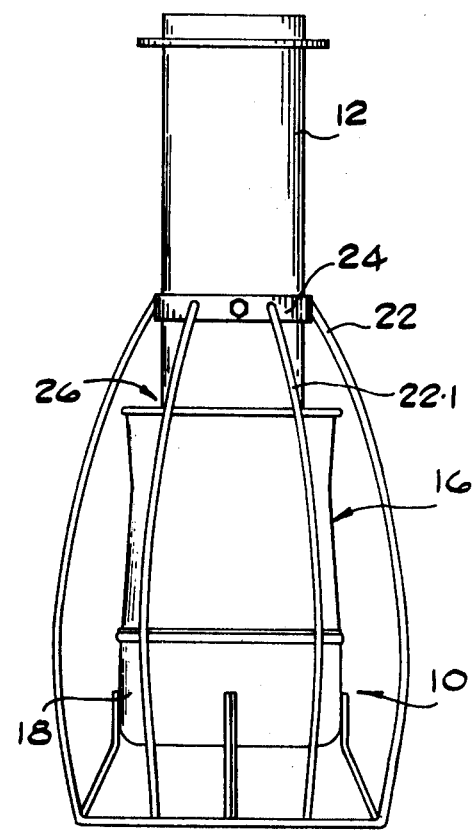
FIG. 1 is an elevational view of a nozzle according to the invention.

In these figures, a nozzle shown generally at 10 comprises a tube 12 broadening out to form a chamber 14 which is open at its lower end. Around the lower end of the chamber 14 is a collar shown generally at 16 and comprising a U-shaped member 18 fast with a sleeve member 20. The collar 16 is spaced from the outside of the chamber 14 and is retained in the position shown by stays 22, 22.1 etc, fixedly attached to the member 18 and to a sleeve 24 slidable on the outside of the tube 12.

Figure 2:
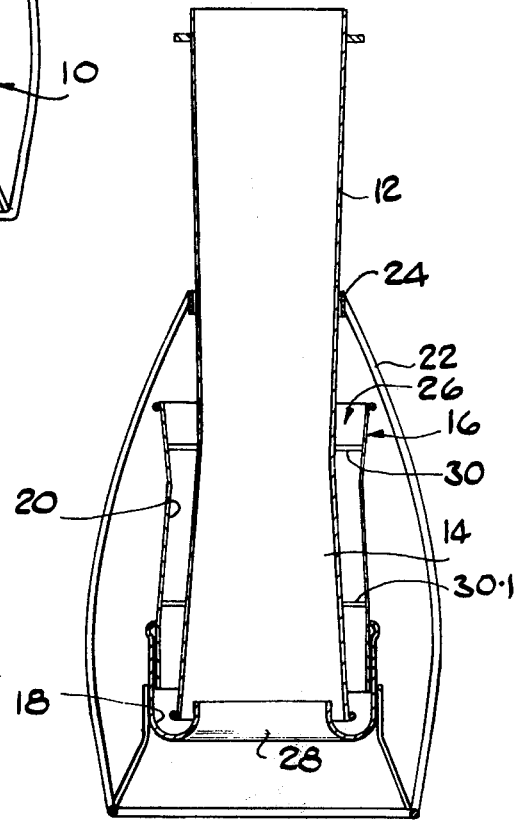
FIG. 2 is a longitudinal section through the nozzle of FIG. 1.

As can be seen from FIG. 2, an air inlet 26 of annular shape is formed between the collar 16 and the tube 12. Air can be sucked in through the annular inlet 26 at the top of the collar, around the tube 12 and up inside the chamber 14. By moving the sleeve 24, and hence the U-shaped member 18, up or down the tube 12 and sleeve member 20, the amount of air entering the chamber 14 can be adjusted. The other inlet into the chamber 14 is provided across the interior lip 28 of the collar. Fixed spacers 30, 30.1 are provided between the chamber 14 and the sleeve member 20.

In use the upper end of the tube 12 is connected to a hose leading to a suction apparatus. The nozzle 10 is lowered into a ship's hold and suction applied. The positioning of the sleeve 24 on the tube 12 is adjusted to give the optimum ratio of air to fish sucked out of the hold. The sleeve can then be bolted in this position. The fish are sucked up the nozzle and separated from the air.

We have found that a 0.7 horsepower motor per ton of fish offloaded per hour is sufficient for use with the nozzle described.

I claim:

1. A suction nozzle for use in handling fish, said suction nozzle comprising a tubular inner casing defining a chamber between top and bottom ends thereof, the top end forming an outlet having means for connection to a hose, a sleeve slidable on the outside of the tubular inner casing between the two ends thereof, a tubular outer casing of shorter length and larger diameter than the inner casing, said outer casing being spaced from the inner casing to form an annulus between the two casings and being positioned between the sleeve and the bottom end of the chamber, a collar fast with the bottom end of the outer casing, said collar having an inwardly-directed lip which extends partly into the interior of the tubular inner casing to form an aperture between opposite sides of the lip to define a first inlet into the chamber, as well as an annular space bounded by the lip and the collar as one wall and the tubular inner casing as the other wall, said annular space leading from the annulus between the inner and outer tubular casing into the chamber to define a second inlet into the chamber, said collar being attached by stays to the sleeve positioned on the outside of the tubular inner casing, thereby enabling the tubular outer casing and collar to be moved with respect to the tubular inner casing and so vary the cross-sectional area of the said annular space, and means for locking the sleeve to the tubular inner casing to enable the cross-sectional area of the second inlet to be adjusted to and locked at a predetermined value.

* * * * *